(12) United States Patent
Orlean

(10) Patent No.: US 6,294,727 B1
(45) Date of Patent: Sep. 25, 2001

(54) TAKEOUT ANCHOR AND PROTECTIVE COVER

(75) Inventor: Jerzy Orlean, Houston, TX (US)

(73) Assignee: Syntron, Inc., Houston, TX (US)

( * ) Notice: Subject to any disclaimer, the term of this patent is extended or adjusted under 35 U.S.C. 154(b) by 0 days.

(21) Appl. No.: 09/255,452

(22) Filed: Feb. 19, 1999

(51) Int. Cl.$^7$ ................................................ H02G 15/013
(52) U.S. Cl. ...................... 174/11 R; 174/76; 174/77 R
(58) Field of Search ...................... 174/76, 77 R, 174/92, 88 R, 11 R; 439/278, 624, 505; 73/592; 367/86

(56) References Cited

U.S. PATENT DOCUMENTS

| | | | |
|---|---|---|---|
| 3,163,703 | * 12/1964 | McLoad | 174/11 R |
| 4,811,311 | * 3/1989 | Woodall, Jr. et al. | 367/178 |
| 5,245,133 | * 9/1993 | DeCarlo et al. | 174/76 X |
| 5,417,592 | 5/1995 | West | 439/624 |
| 5,555,220 | * 9/1996 | Minto | 166/250.01 |
| 5,774,423 | * 6/1998 | Pearce et al. | 367/157 |
| 5,987,990 | * 11/1999 | Worthington et al. | 73/592 |

* cited by examiner

Primary Examiner—Dean A. Reichard
Assistant Examiner—Chau N. Nguyen
(74) Attorney, Agent, or Firm—Bracewell & Patters L.L.P.

(57) ABSTRACT

A three part enclosure system protects a sensor package and its connection to a main seismic cable. The enclosure system further anchors the sensor package to the cable. The enclosure system includes a combination takeout and anchor, molded to the cable; an opposing anchor; and a substantially cylindrical enclosure body or protective cover, adapted to contain, locate, and protect the sensor package and pigtail wire connections.

16 Claims, 1 Drawing Sheet

TAKEOUT ANCHOR AND PROTECTIVE COVER

FIELD OF THE INVENTION

The present invention relates generally to the field of takeout structures which connect a seismic sensor string to a cable, and particularly to an enclosure for a seismic sensor which simultaneously serves as an anchor for the sensor.

BACKGROUND OF THE INVENTION

To conduct an ocean bottom seismic survey, a cable having a plurality of pairs of electrical conductors is laid out along a survey line and connected at one end to a recording device. At spaced locations along the cable, a "takeout" is provided that enables the leader wire of a string of geophones to be electrically connected to one of the pairs of conductors inside the cable. Each pair of conductors and the phones connected to it form a data channel so that acoustic waves that are reflected upward from underground geologic structures are recorded on that channel. Once a set a data has been captured and recorded along the survey line, the cable is commonly dragged to the next survey line in preparation for another set of data. The cable may also be retrieved and redeployed in a new location to acquire another set of data.

In dragging or redeploying the cable from one survey line to the next, the seismic sensor package is commonly subjected to a number of potentially damaging obstacles on the ocean floor. In the past, the sensor, takeout, and the region of the cable in close proximity to them have been wrapped in heavy tape, and sometimes enclosed in a shrink-wrap plastic to minimize this damage. Unfortunately, this wrapping has often proved less than satisfactory, resulting in damage to the cable, the sensor, and often leading to catastrophic seawater in-leakage at the cable penetrations.

Aside from sealing the takeout, the tape and wrap applied to the cable are intended to anchor the sensor package along with its connecting leader cable. As the wrapping is damaged, the sensor package with the connecting leader cable is allowed to move freely, causing a further mechanical damage to the sensors and connecting cable.

Thus, there remains a need for an enclosure to mechanically protect and anchor the sensor package with all its connecting cable to the seismic cable. Such an enclosure should still permitting free access of seawater into the sensor held within the enclosure.

SUMMARY OF THE INVENTION

This invention solves these and other drawbacks of the prior art by providing a three part enclosure system. The enclosure system includes a combination takeout and anchor, molded to the cable; an opposing anchor; and a substantially cylindrical enclosure body, referred to herein as a protective cover, adapted to engage the combination takeout/anchor and the opposing anchor.

The combination takeout/anchor is molded to the cable after the leader wire is electrically connected to one of the pairs of conductors inside the cable. This way, the combination takeout/anchor seals the takeout, and anchors it in place. The opposing anchor is spaced apart from the combination takeout/anchor and may alternatively provide for a takeout as well.

Each of the combination takeout/anchor and the opposing anchor define an annular groove to receive a mating flange of the cylindrical enclosure body. The enclosure body or protective cover is preferably formed of a pair of enclosure halves which are clamped down to engage the annular grooves by way of a cable clamp or other appropriate means.

The interior surface of the cylindrical enclosure body defines three substantially cylindrical cavities, one each for the cable body, the sensor assembly, and connecting wires. The cylindrical enclosure body further defines at least one opening through the body to allow seawater to flow inside the body, thereby permitting an acoustic signal to reach the sensor assembly inside.

These and other features and advantages of this invention will become move apparent in connection with the following detailed description of a preferred embodiment, taken in conjunction with the appended drawings.

DETAILED DESCRIPTION OF A PREFERRED EMBODIMENT

Structure of the Invention

Figure 1:
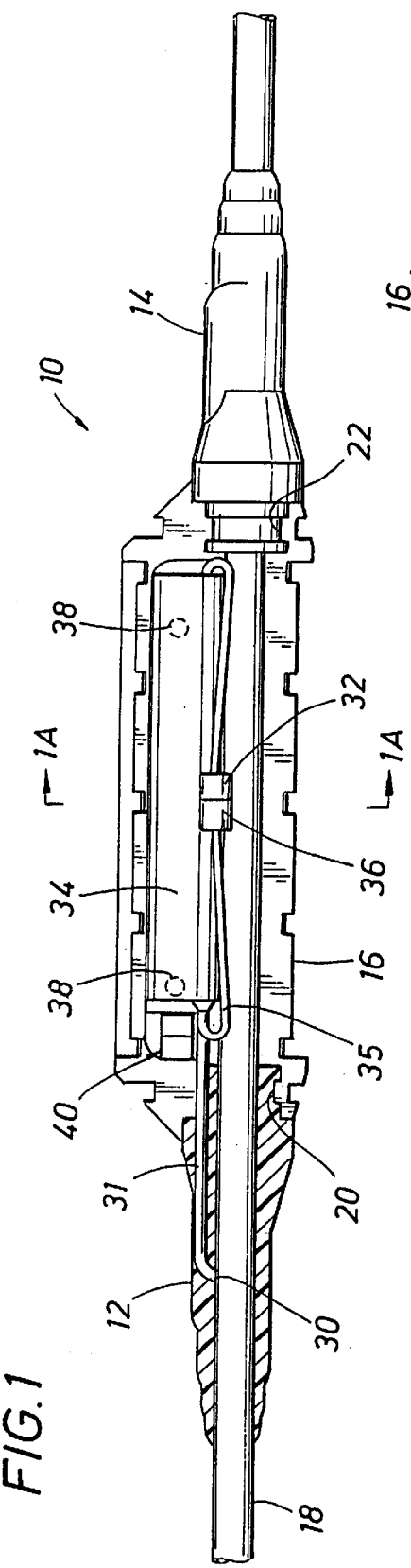
FIG. 1 is a side sectional view of the enclosure system of this invention.

Referring to Figure, an enclosure system 10 includes a combination takeout and anchor 12, an opposing anchor 14, and a protective cover 16 between them, all mounted to a main cable 18. FIG. 1 depicts a takeout pigtail drip exit from the main cable at the combination takeout and anchor 12, but a dual drop may be used. The combination takeout and anchor 12 is molded directly to the main cable 18 after connection is made to the appropriate pair of conductors within the cable by making a slit in the jacket of the cable, removing the insulation from short sections of the selected pair of the conductors, and joining the sensor leads to the bared ends of the conductors. In this way, the opening for the takeout is sealed and anchored by the molded body 12.

Figure 2:
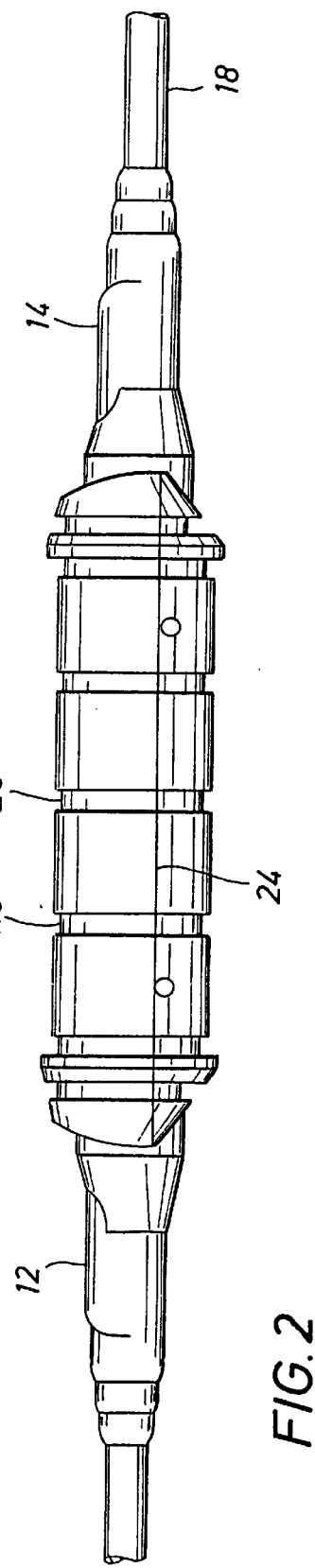
FIG. 2 is a top view of the enclosure, illustrating the mounting of the enclosure body to the opposing anchors.

The opposing anchor 14 is also molded to the cable 18, and is shaped like the body 12. The body 12 includes an annular groove 20 and the anchor 14 has a similar annular groove 22, both of which are configured to receive a mating interior flange of the cover 16. The cover 16 is preferably formed as a pair of mating halves separated at a seam 24, and shown in FIG. 2. The cover 16 is then held together and in place with a plurality of bands 26, made of a corrosion-proof material, which are applied within a plurality of annuli 28 in the cover.

Connection to a selected pair of conductors in the cable 18 is made through a penetration 30. This lead, shown in FIG. 1 as a takeout pigtail 31, terminates in a connector end 32, which is connected to a sensor package 34 through a sensor hydrophone connector pigtail 35 to a connector end 36. Thus, the interior of the protective cover 16 includes substantially cylindrical cavities for three items: the cable 18, the sensor package 34, and the connector comprising the ends 32 and 36. This connector combination may be referred to as a pigtail connection.

Figure 1A:
FIG. 1a is an end view of the one half of the enclosure taken along section A—A, depicting the locations of the three cavities within the enclosure body

FIG. 1A shows an end view of the cover 16 to illustrate the placement of the cavities within the cover which receive the various components inside the cover. The three cavities include the locations for the cable 18, the sensor package 34, and the pigtail connector 32, 36. Note that the cover 16 is an elongated cylinder, but it is not coaxial with the main cable. Also, the cover 16 includes vent holes 38 to permit the inflow of water for the conduction of acoustic signals to a sensor hydrophone 40.

Having now described the structure in detail, the description of this invention will conclude with the assembly of the invention.

Method of Making

Once a takeout is made in the conventional manner by coupling to a selected pair of wires within the cable 18, the takeout assembly is molded to the cable by the combination anchor and takeout body 12. Simultaneously, the opposing body 14 is molded to the cable. If a dual drop is desired, a takeout may be made at the body 14 and molded to the cable in the same way as with the body 12.

At this point, the lead from the takeout terminates in the connector end 32, which is now connected to the connector end 36, and the sensor assembly 34 is positioned alongside the cable. The two complementary halves of the protective cover 16 are brought together around the cable and enclosing the sensor assembly. The bands 26 are then placed around the body and secured in place The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A protective cover structure for a takeout and sensor package assembly anchored to a seismic cable, the structure comprising:
   a. a first anchor molded over the takeout and molded to the seismic cable;
   b. an opposing anchor molded to the seismic cable and spaced apart from the first anchor; and
   c. a protective cover between the first anchor and the opposing anchor and enclosing the sensor package.

2. The structure of claim 1 wherein the protective cover comprises a pair of complementary halves releasably fixed to the seismic cable at the first anchor and the opposing anchor.

3. The structure of claim 2 further comprising a band around the protective cover to hold the halves together.

4. The structure of claim 1, wherein the protective cover includes holes therethrough for fluid communication to the sensor package for an acoustic signal.

5. The structure of claim 1 further comprising:
   a. an annular groove on the first anchor to receive a first mating flange in the protective cover; and
   b. an annular groove on the opposing anchor to receive a second mating flange in the protective cover.

6. The structure of claim 1, wherein the protective cover includes a substantially cylindrical cavity to receive the sensor assembly.

7. The structure of claim 1, wherein the protective cover includes a substantially cylindrical cavity to receive the seismic cable.

8. The structure of claim 1, further comprising a connector between the takeout and the sensor assembly, and wherein the protective cover includes a substantially cylindrical cavity to receive the connector.

9. A method of protecting a sensor assembly on a seismic sensor cable, comprising the steps of:
   a. attaching a takeout pigtail to a pair of conductors within the sensor cable at a penetration;
   b. molding a takeout anchor to the cable over a length of the takeout pigtail at the penetration;
   c. molding an opposing anchor to the cable spaced apart from the takeout anchor; and
   d. mounting a protective cover between the takeout anchor and the opposing anchor and enclosing the sensor assembly.

10. The method of claim 9, wherein the step of mounting a protective cover includes the steps of:
    a. mounting a pair of complementary cover halves over the sensor assembly; and
    b. releasably fixing the cover halves together with a plurality of bands.

11. A protective cover structure for a takeout and sensor package assembly anchored to a seismic cable, the structure comprising:
    a. a first anchor molded over the takeout and molded to the seismic cable, the first anchor defining a first radially extending annular groove;
    b. an opposing anchor molded to the seismic cable and spaced apart from the first anchor, the opposing anchor defining a second radially extending annular groove; and
    c. a protective cover between the first anchor and the opposing anchor and enclosing the sensor package, the protective cover releasably fixed to the first anchor at the first annular groove and the opposing anchor at the second annular groove.

12. The structure of claim 11, wherein the protective cover comprises a pair of complementary halves fixed together by a plurality of bands.

13. The structure of claim 11, wherein the protective cover includes a plurality of holes therethrough for fluid communication of an acoustic signal to the sensor package.

14. The structure of claim 11, wherein the protective cover includes a cavity to receive the sensor package.

15. The structure of claim 11, wherein the protective cover includes a cavity to receive the seismic cable.

16. The structure of claim 11, further comprising a connector between the takeout and the sensor package, and wherein the protective cover includes a substantially cylindrical cavity to receive the connector.

* * * * *